United States Patent
Hassan et al.

(10) Patent No.: US 9,699,735 B2
(45) Date of Patent: Jul. 4, 2017

(54) SUB-CHANNEL DETECTION FOR WIRELESS DATA COMMUNICATION

(71) Applicant: Microsoft Technology Licensing, LLC, Redmond, WA (US)

(72) Inventors: Amer A. Hassan, Kirkland, WA (US); Billy R. Anders, Jr., Bothell, WA (US); Dennis E. Flanagan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 13/662,899

(22) Filed: Oct. 29, 2012

(65) Prior Publication Data

US 2014/0119208 A1 May 1, 2014

(51) Int. Cl.
*H04W 52/02* (2009.01)

(52) U.S. Cl.
CPC .... *H04W 52/0232* (2013.01); *H04W 52/0261* (2013.01); *Y02B 60/50* (2013.01)

(58) Field of Classification Search
CPC ............. H04W 24/08; H04W 52/0232; H04W 52/0261; Y02B 60/50
USPC ........................................................ 370/252
See application file for complete search history.

(56) References Cited

U.S. PATENT DOCUMENTS

| | | | |
|---|---|---|---|
| 7,039,004 B2 | 5/2006 | Sun et al. | |
| 7,110,783 B2 | 9/2006 | Bahl et al. | |
| 7,206,350 B2 | 4/2007 | Korobkov et al. | |
| 7,230,933 B2 | 6/2007 | Bahl et al. | |
| 7,561,558 B2 | 7/2009 | Agarossi et al. | |
| 7,583,625 B2 | 9/2009 | Bennett | |
| 7,630,300 B2 * | 12/2009 | Warren et al. | 370/222 |
| 7,719,954 B2 * | 5/2010 | Sung | 370/203 |
| 7,969,950 B2 * | 6/2011 | Iyer et al. | 370/338 |
| 8,130,669 B2 * | 3/2012 | Radunovic et al. | 370/252 |

(Continued)

FOREIGN PATENT DOCUMENTS

| | | |
|---|---|---|
| EP | 1986402 | 10/2008 |
| KR | 20070079522 | 8/2007 |

OTHER PUBLICATIONS

"International Search Report and Written Opinion", Application No. PCT/US2013/066448, Feb. 3, 2014, 18 pages.

(Continued)

*Primary Examiner* — Hassan Kizou
*Assistant Examiner* — Abdullahi Ahmed

(57) ABSTRACT

Techniques for sub-channel detection for wireless data communication are described. In at least some implementations, techniques can utilize subsets of available wireless channels for inter-device data communication. For instance, in at least some embodiments, a wireless connection between a client device and a wireless device can be established according to a pre-specified subset of sub-channels. Further, in at least some embodiments, a wireless device can be configured to transmit and/or receive data using a specific subset of sub-channels, while a client device can be configured to scan a larger set of sub-channels to search for data communication from the wireless device. The client device can detect transmitted signal from the wireless device at the subset of sub-channels, and can utilize the set of sub-channels for data communication between the wireless device and the client device.

20 Claims, 10 Drawing Sheets

(56) References Cited

U.S. PATENT DOCUMENTS

| | | | |
|---|---|---|---|
| 8,144,793 | B2 | 3/2012 | Hassan et al. |
| 8,532,597 | B2* | 9/2013 | Chu .......................... 455/179.1 |
| 8,542,646 | B1* | 9/2013 | Ding ............................. 370/329 |
| 8,570,898 | B1* | 10/2013 | Kopikare et al. ............. 370/254 |
| 2002/0110086 | A1* | 8/2002 | Reches ......................... 370/235 |
| 2006/0018276 | A1* | 1/2006 | Kim et al. .................... 370/329 |
| 2007/0053445 | A1* | 3/2007 | Schaar et al. ............ 375/240.28 |
| 2007/0135061 | A1* | 6/2007 | Buck et al. ..................... 455/73 |
| 2008/0292032 | A1 | 11/2008 | Belogolovy |
| 2009/0010274 | A1* | 1/2009 | Koskan ............. H04W 72/1205 |
| | | | 370/437 |
| 2010/0097950 | A1* | 4/2010 | Jeon ............................ 370/252 |
| 2011/0038360 | A1* | 2/2011 | Ho ........................ H04J 3/1682 |
| | | | 370/346 |
| 2012/0257508 | A1* | 10/2012 | Reunamaki et al. ......... 370/241 |
| 2013/0034047 | A1* | 2/2013 | Chan ....................... H04L 45/32 |
| | | | 370/315 |
| 2013/0301438 | A1* | 11/2013 | Li et al. ........................ 370/252 |
| 2014/0086157 | A1* | 3/2014 | Bontu et al. .................. 370/329 |
| 2014/0112246 | A1* | 4/2014 | Park ...................... H04W 28/16 |
| | | | 370/328 |

OTHER PUBLICATIONS

Haas, et al., "Interference Aware Medium Access in Cellular OFDMA/TDD Networks",Retrieved at <<http://www.cwc.jacobs-university.de/pdf/hnona0601.pdf>>,IEEE International Conference on Communications, Jun. 2006, pp. 6.

"Foreign Notice of Allowance", EP Application No. 13788827.7, Feb. 17, 2016, 8 pages.

\* cited by examiner

| Device ID | Device Type | No. of Sub-channels | Sub-channel Set |
|---|---|---|---|
| | Wireless Keyboard | 3 | 7, 9, 11 |
| 01-23-45-67-89-ab | Wireless Mouse | 6 | 13, 15, 17, 19, 21, 23 |
| | Wireless Keyboard | 5 | 1, 3, 5, 7, 9 |
| | Wireless Touch Pad | 12 | 21, 22, 23, 24, 25, 26, 27, 28, 29, 30, 31, 32 |
| | Wireless Speaker | 4 | 2, 4, 6, 8 |
| [ · · · ] | [ · · · ] | [ · · · ] | [ · · · ] |

Fig. 3

SUB-CHANNEL DETECTION FOR WIRELESS DATA COMMUNICATION

BACKGROUND

Many devices today utilize some form of wireless data communication. While a variety of different types of wireless data communication exist, radio frequency (RF) communication is pervasive. Examples of RF communication include cellular networks (e.g., for cell phones), Wi-Fi®, broadcast television, global positioning system (GPS) navigation, and so forth.

RF data communication can be particularly useful to facilitate inter-device communication. For instance, a wireless input/output (I/O) device (e.g., a mouse, a touchpad, a keyboard, and so on) can communicate with a computer utilizing various forms of RF communication. This can enable a user to provide input to a computer independent of a wired connection between an input device and the computer.

In utilizing RF communication for battery powered devices (e.g., a wireless mouse, a wireless keyboard, and so on), power management is a prominent consideration. For example, longer effective battery charge life can be realized by reducing the amount of power utilized for RF communication. Certain RF communication protocols, however, can be power-intensive. Thus, reducing power usage when employing such protocols presents a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for sub-channel detection for wireless data communication are described. In at least some implementations, techniques can utilize subsets of available wireless channels for inter-device data communication. For instance, consider a scenario where a wireless device (e.g., a wireless mouse) is configured to communicate with a client device, such as a desktop computer, via a direct wireless local area network (WLAN) technology between the wireless device and the client device. Further, a particular WLAN technology may offer a set of wireless signals, each signal consisting of a collection of sub-channels, for transmitting and receiving data. As explained in detail herein, a wireless device may conserve power by utilizing a subset (e.g., less than all) of the available wireless sub-channels for transmitting and/or receiving data.

In at least some embodiments, a wireless connection between a client device and a wireless device can be established according to a pre-specified subset of sub-channels. For instance, a wireless device can be configured to transmit data to a client device using a pre-specified subset of sub-channels. Further, the client device can be configured to "look" for data from the wireless device at the pre-specified subset of sub-channels.

In at least some embodiments, a wireless device can be configured to transmit and/or receive data using a specific subset of sub-channels, while a client device can be configured to scan a larger set of sub-channels to search for data communication from the wireless device. For instance, the client device can scan through a group of available sub-channels for received signals that exceed a threshold level of energy. When the client device scans the subset of sub-channels used by the wireless device for transmitting, the client device can detect transmitted signal from the wireless device that meets or exceeds the threshold level of energy. The client device can process the detected signal and determine that the wireless device is transmitting at the specified subset of sub-channels. Thus, the client device can utilize the specified set of sub-channels for data communication between the wireless device and the client device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3 is an illustration of an example device table that can be employed according to techniques discussed herein and in accordance with one or more embodiments.

DETAILED DESCRIPTION

Overview

Figure 1:
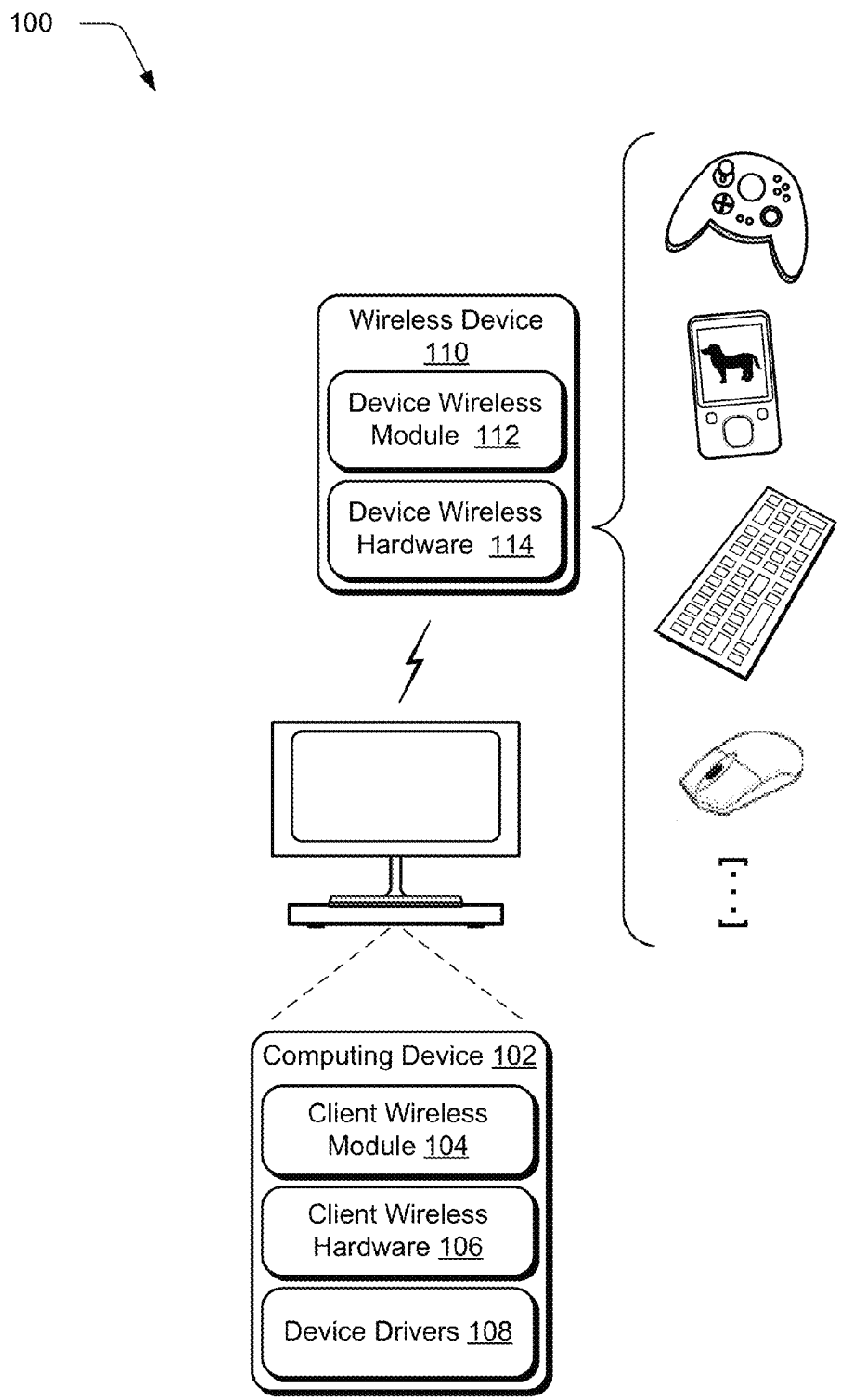
FIG. 1 is an illustration of an environment in an example implementation that is operable to employ techniques discussed herein in accordance with one or more embodiments.

Techniques for sub-channel detection for wireless data communication are described. In at least some embodiments, a complete (or full) set of sub-channels constitute a wireless signal for transmitting information. Techniques can utilize subsets of available wireless sub-channels for inter-device data communication. For instance, consider a scenario where a wireless device (e.g., a wireless mouse) is configured to communicate with a client device, such as a desktop computer, via a direct wireless local area network (WLAN) connection between the wireless device and the client device. The WLAN, for example, can be implemented by the client device according to the 802.11 Standards for wireless data communication managed by the Institute of Electrical and Electronics Engineers (IEEE). The 802.11 Standards are often referred to as "Wi-Fi®", but are referenced herein as WLAN. As explained in detail below, although a particular WLAN may offer a particular set of wireless channels for transmitting and receiving data, a wireless device may conserve power by utilizing a subset (e.g., less than all) of the available wireless channels for transmitting and/or receiving data.

Typically, the WLAN standards specify particular channel frequency bands which wireless devices may utilize to communicate. Examples of these frequency bands include 2.4 gigahertz (GHz), 3.6 GHz, 5 GHz, and so on. Further, a particular frequency band can be split into multiple channels that can each be used to transmit signals. For instance, a frequency band can be divided into multiple non-overlapping channels that can be selected from for transmitting and/or receiving signals. In at least some implementations, the channels can correspond to 20 megahertz (MHz)-wide divisions of a particular frequency band.

A channel can be further divided into multiple sub-channels (e.g., carrier signals) that can be individually utilized to transmit and/or receive signals. For instance, a 20 MHz-wide channel (e.g., in one of the frequency bands mentioned above) can be split into 52 sub-channels that can each be used to transmit and receive RF signals. In implementations that utilize signal modulation, such as orthogonal frequency division multiplexing (OFDM), some of the sub-channels may be utilized for transmitting data, while others may be utilized for error correction. For instance, in implementations that apply OFDM to 52 sub-channels, 48 of the sub-channels may be utilized to transmit and receive data, while 4 of the sub-channels may be utilized for error correction. This allocation of available sub-channels is presented for purpose of example only, and implementations may allocate available sub-channels for a wide variety of different tasks and/or purposes.

Continuing the wireless device/WLAN example introduced above, assume that the WLAN implemented by the client device offers a set of N sub-channels (e.g., where N=52) that the wireless device may utilize to transmit data to, and/or receive data from, the client device. According to various embodiments discussed herein, the wireless device is configured to utilize a subset of the N sub-channels to transmit and/or receive data, such as 2 sub-channels, 5 sub-channels, 20 sub-channels, and so forth. By utilizing less than all of the available sub-channels, the wireless device conserves battery power to extend the effective battery charge life for the wireless device.

In at least some embodiments, a wireless connection between a client device and a wireless device can be established according to a pre-specified subset of sub-channels. For instance, and continuing the wireless device/WLAN example introduced above, the wireless device can be configured to transmit data using a pre-specified subset of the N sub-channels. Further, the client device can be configured to "look" for data from the wireless device at the pre-specified subset of sub-channels, and not at others of the N sub-channels.

For instance, a device driver for the wireless device that is installed on the client device can be pre-configured to receive data from and/or transmit data to the wireless device utilizing the pre-specified subset of sub-channels. Thus, the device driver can ignore other available sub-channels and simply use the pre-specified subset of sub-channels for wireless data communication between the client device and the wireless device. For example, instead of scanning through an entire spectrum of available sub-channels and searching for data communication from the wireless device, the client device can simply monitor the pre-specified subset of sub-channels for data communication from the wireless device.

In at least some alternative embodiments, a wireless device can be configured to transmit and/or receive data using a specific subset of sub-channels, while a client device can be configured to scan a larger set of sub-channels to search for data communication from the wireless device. For instance, the client device can scan through a group of available sub-channels for received signals that exceed a threshold level of energy, e.g., in milliwatts (mW), decibels (dB), decibel milliwatts (dBm), and so on. When the client device scans the subset of sub-channels used by the wireless device for transmitting, the client device can detect transmitted signal from the wireless device that meets or exceeds the threshold level of energy. As detailed below, the client device can process the detected signal and determine that the wireless device is transmitting at the specified subset of sub-channels. Thus, the client device can utilize the specified set of sub-channels for data communication between the wireless device and the client device.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Reducing Redundancy in Correction Coding" describes some example implementations that can reduce redundancy in correction coding in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for sub-channel detection for wireless data communication. Environment 100 includes a computing device 102 which can be embodied as any suitable computing device such as, by way of example and not limitation, a desktop computer, a portable computer (e.g., a laptop), a handheld computer such as a personal digital assistant (PDA), a tablet computer, and so forth. One of a variety of different examples of a computing device 102 is shown and described below in FIG. 10.

The computing device 102 of FIG. 1 is illustrated as including a client wireless module 104, which is representative of functionality to enable the computing device 102 to communicate wirelessly with other devices and/or entities. The client wireless module 104 can be configured to enable data communication via a variety of different wireless techniques and protocols. Examples of such techniques and/or protocols include cellular communications (e.g. 2G, 3G, 4G, and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16), wireless telephone networks, and so on. For instance, the client wireless module 104 is configured to employ techniques for sub-channel detection for wireless data communication discussed herein.

The computing device 102 further includes client wireless hardware 106, which is representative of various hardware components that can be employed to enable the computing device 102 to communicate wirelessly. Examples of the client wireless hardware 106 include a radio transmitter, a radio receiver, various types and/or combinations of antennas, impedance matching functionality, and so on.

Further included as part of the computing device 102 are one or more device drivers 108, which are representative of functionality to enable the computing device 102 to interact with various devices, and vice-versa. For instance, the device drivers 108 can enable various functionalities of the computing device 102 (e.g., an operating system, applications, services, and so on) to interact with different devices, such as input/output (I/O) devices associated with the computing device 102. Further, the device drivers 108 can enable devices (e.g., I/O devices) associated with the computing device 102 to interact with various functionalities of the computing device 102.

The environment 100 further includes a wireless device 110, which is representative of a variety of different devices that are configured to communicate wirelessly with the computing device 102. Examples of the wireless device 110 include a mouse, a keyboard, a game controller, a touchpad, an audio output device, a video display device, a sensor, a camera, and so on. These examples are presented for purpose of illustration only, and a wide variety of other device types and/or instances may be employed within the spirit and scope of the claimed embodiments.

The wireless device 110 includes a device wireless module 112, which is representative of functionality to enable wireless data communication according to techniques for sub-channel detection for wireless data communication discussed herein. For instance, the device wireless module 112 can enable the wireless device 110 to communicate wirelessly with the computing device 102, such as via data communication between the device wireless module 112 and the client wireless module 104. The device wireless module 112 can be configured to enable data communication via a variety of different wireless techniques and/or protocols, examples of which are referenced above and below.

Further included as part of the wireless device 110 is device wireless hardware 114, which is representative of various hardware components that can be employed to enable the wireless device 110 to communicate wirelessly. Examples of the client wireless hardware 114 include a radio transmitter, a radio receiver, various types and/or combinations of antennas, impedance matching functionality, and so on.

According to implementations discussed herein, techniques can be employed to establish wireless data communication between the wireless device 110 and the computing device 102 utilizing a variety of different wireless data communication techniques and/or protocols. For instance, with reference to the 802.11 standards discussed above, techniques can be employed to enable direct wireless data communication between the wireless device 110 and the computing device 102 via a WLAN connection between the devices, e.g., independent of a separate access point to manage a WLAN connection between the devices.

One example way of establishing and maintaining a WLAN connection between the wireless device 110 and the computing device 102 utilizes portions of the Wi-Fi Direct™ protocol established and managed by IEEE. For instance, the computing device 102 and/or the wireless device 110 can be configured to communicate via the Wi-Fi Direct™ protocol, such as via the exchange of Wi-Fi Direct™ compliant data packets. Thus, in at least some implementations, techniques for sub-channel detection for wireless data communication discussed herein can be employed in the context of Wi-Fi Direct™ data communication between devices, such as between the computing device 102 and the wireless device 110. This is not intended to be limiting, however, and a wide variety of different wireless techniques and protocols may be utilized in accordance with the disclosed embodiments. Further, while certain aspects of established wireless protocols (e.g., 802.11, Wi-Fi Direct™, and so on) may be utilized in tandem with techniques discussed herein to enable wireless data communication between devices, techniques discussed herein are inventive and are not to be considered part of these protocols as they currently exist.

For purpose of illustration, the environment 100 is discussed with reference to wireless data communication between a single wireless device 110 and the computing device 102. However, embodiments discussed herein may be employed to generate and manage wireless connections between more than two devices. For instance, the computing device 102 can utilize techniques discussed herein to communicate wirelessly with multiple wireless devices concurrently, including the wireless device 110. For instance, data communication between the computing device 102 and multiple wireless devices can be managed via virtual (e.g., logical) connections to the wireless devices. Further, the computing device 102 can employ various resource scheduling techniques and/or algorithms to manage virtual connections with multiple wireless devices. Examples of such resource scheduling techniques include round-robin scheduling, serial scheduling, priority-based scheduling, and so forth.

While the wireless device 110 is discussed herein as being configured to communicate wirelessly, this is not intended to be limiting. For instance, in at least some embodiments the wireless device 110 may be configured to communicate wirelessly with a particular device (e.g., the computing device 102), while be configured to communicate via a wired connection with a different device.

Although not expressly illustrated in FIG. 1, the environment 100 may include a network via which the computing device 102 and the wireless device 110 may communicate. Examples of such a network include a local area network (LAN), a wide area network (WAN), the Internet, and so on. Thus, the computing device 102 and the wireless device 110 may communicate with each other directly, and/or via one or more intermediary networks.

Having described an example environment in which the techniques described herein may operate, consider now a discussion of some example implementation scenarios in accordance with one or more embodiments.

Example Implementation Scenarios

The following discussion describes example implementation scenarios for sub-channel detection for wireless data communication in accordance with one or more embodiments. In portions of the following discussion, reference will be made to the environment 100 of FIG. 1.

Figure 2:
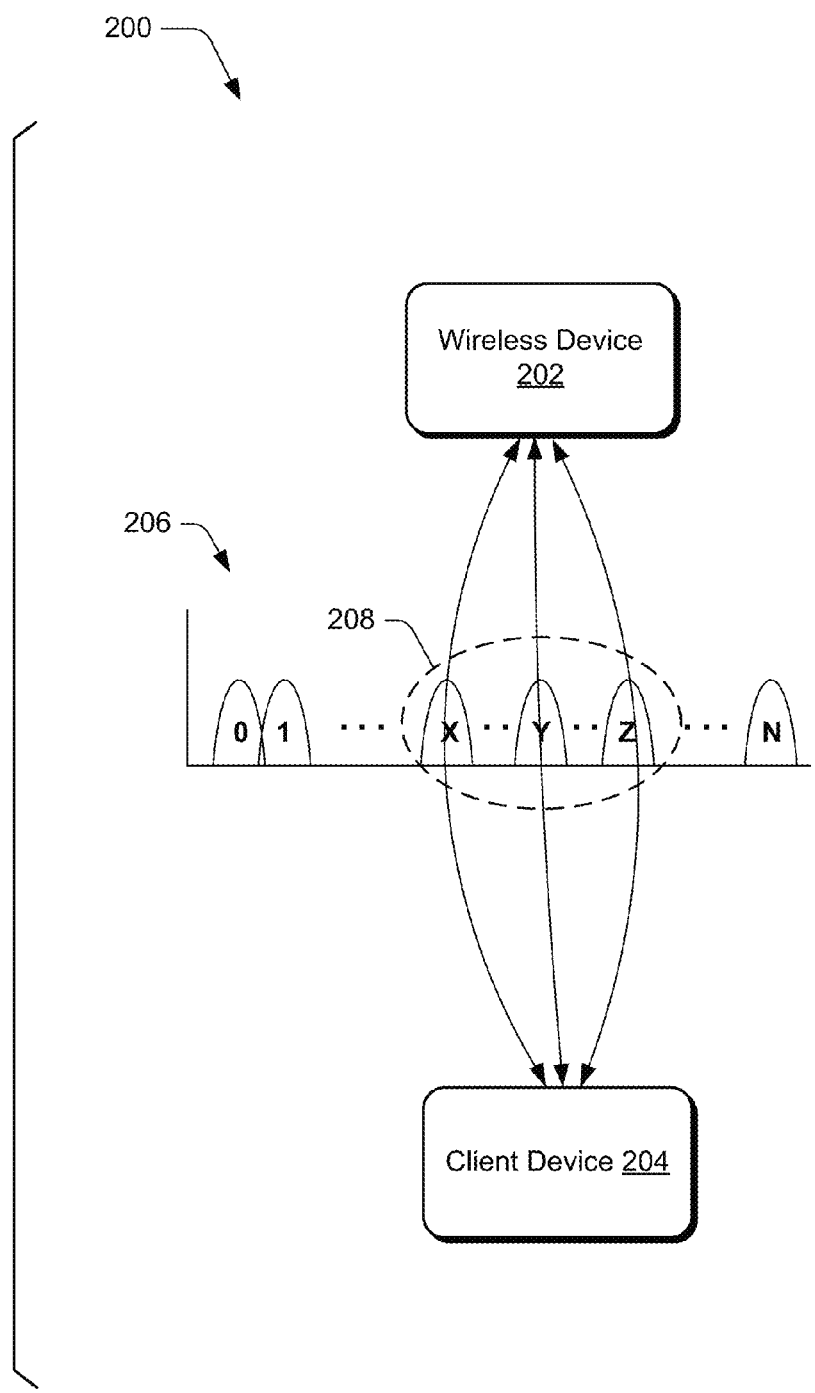
FIG. 2 is an illustration of an example system that is operable to employ techniques discussed herein in accordance with one or more embodiments.

FIG. 2 illustrates an example system 200, which can be employed to implement techniques for sub-channel detection for wireless data communication discussed herein. The system 200 includes a wireless device 202, which can be configured as an embodiment of the wireless device 110, discussed above. The system 200 further includes a client device 204, which can be configured as an embodiment of the computing device 102 of the environment 100.

Further illustrated is a sub-channel set 206, which includes a set of sub-channels that are available for wireless data communication, e.g., with the client device 204. The sub-channel set 206, for instance, can correspond to sub-channels in a particular RF band, examples of which are discussed above. In at least some implementations, the sub-channel set 206 corresponds to sub-channels that the client device 204 is configured to utilize for wireless data communication, e.g., according to wireless software and/or hardware capabilities of the client device 204. In this example, the sub-channel set 206 includes N number of available sub-channels.

The wireless device 202 is configured (e.g., pre-programmed) to communicate via a subset 208 of the sub-channel set 206. The subset 208 includes a discrete set of the sub-channel set 206, and can be configured as contiguous (e.g., continuous) sub-channels, non-contiguous sub-channels, or combinations thereof. Further, although the subset 208 is illustrated as including 3 sub-channels, embodiments may employ subsets with any suitable number of sub-channels. Thus, in at least some embodiments, the wireless device 202 is configured to communicate via channels of the subset 208, and not via other channels of the sub-channel set 206. For instance, during data transmission the wireless device 202 can apply energy to channels of the subset 208 for data transmission, and can leave the remaining channels of the sub-channel set 206 null, e.g., not energized.

Further to the system 200, the client device 204 is configured to transmit data to and/or receive data from the wireless device 202 via the subset 208. For instance, a device driver for the wireless device 202 that is installed on the client device 204 can be pre-configured to scan the subset 208 for data communication from the wireless device 202, and to ignore other channels of the sub-channel set 206 when initiating data communication with the wireless device 202. Thus, in at least some implementations, a wireless device driver and/or other device-related functionality can be pre-configured to manage wireless data communication for a wireless device utilizing a pre-specified set of one or more sub-channels.

As illustrated in the system 200, the wireless device 202 and the client device 204 are pre-configured to communicate via the subset 208 of the sub-channel set 206, even though the client device 204 includes functionality (e.g., hardware and/or software) for data communication via the entire sub-channel set 208. This can conserve battery charge for the wireless device 202 by transmitting and/or receiving via the subset 208 and not others of the sub-channel set 206, and can conserve time and/or resources of the client device 204 by not causing the client device 204 to scan the entire sub-channel set 206 searching for data communication from the wireless device 202.

FIG. 3 illustrates a device table 300 that is utilized to store information about various wireless devices. For instance, a wireless device and/or a client device can utilize information from the device table 300 to determine a particular set of sub-channels to utilize to send and/or receive data. With reference to the environment 100, the client wireless module 104 and/or the device wireless module 112 can utilize the device table 300 to determine specific sub-channels to utilize for data communication between the computing device 102 and the wireless device 110. Thus, a wireless device and/or a client device can store versions of the device table 300 for purposes of initiating and/or managing wireless data communication with different devices. The device table 300, for instance, may be stored in various types of data storage media as a database and/or other suitable data structure.

The device table 300 includes a device identifier (ID) column 302, which includes identifiers for particular devices and/or categories of devices. Examples of device identifiers include a media access control (MAC) address, an internet protocol (IP) address, an organizationally unique identifier (OUI), and so forth. Thus, in at least some embodiments an ID indicated in the ID column 302 can identify a particular instance of a device and/or a particular category of device.

The device table 300 further includes a device type column 304, which specifies different types of wireless devices that can be utilized in accordance with various embodiments. A sub-channel number column 306 specifies a quantity of sub-channels that are to be used for specific instances of devices, categories of devices, and/or device types. Further, a sub-channel set column 308 specifies specific sub-channels that are to be used for particular instances of devices, categories of devices, and/or device types. In at least some embodiments, the sub-channels indicated in the sub-channel set column 308 correspond to divisions of a particular channel in a specific frequency band, examples of which are discussed above.

In various implementations, specific device types can be allocated a pre-specified quantity of sub-channels and/or a specific set of sub-channels which may be utilized. For instance, a table entry 310 of the device table 300 includes information for a wireless keyboard. For instance, information from the table entry 310 can be applied generally to different devices that are determined to be wireless keyboards.

A table entry 312 includes information for a device and/or category of devices that are associated with a particular device ID. Thus, the device table 300 can specify information for discrete instances of devices. As illustrated, the table entry 312 specifies that a wireless keyboard with a particular device ID is to use 5 sub-channels, i.e., sub-channels 1, 3, 5, 7, and 9. This varies from the information specified in the table entry 310 for wireless keyboards. Thus, in implementations information from the device table 300 can be applied to a wireless device based on which table entry is a more specific match to the device. For example, a table entry that includes a device ID that matches a particular device (e.g., table entry 312) can be considered a more specific match than a table entry that only matches the device type, e.g., table entry 310.

The information included in the device table 300 is presented for purpose of illustration only, and embodiments can be employed to specify a wide variety of different device information for a wide variety of different devices and device types.

Figure 4:
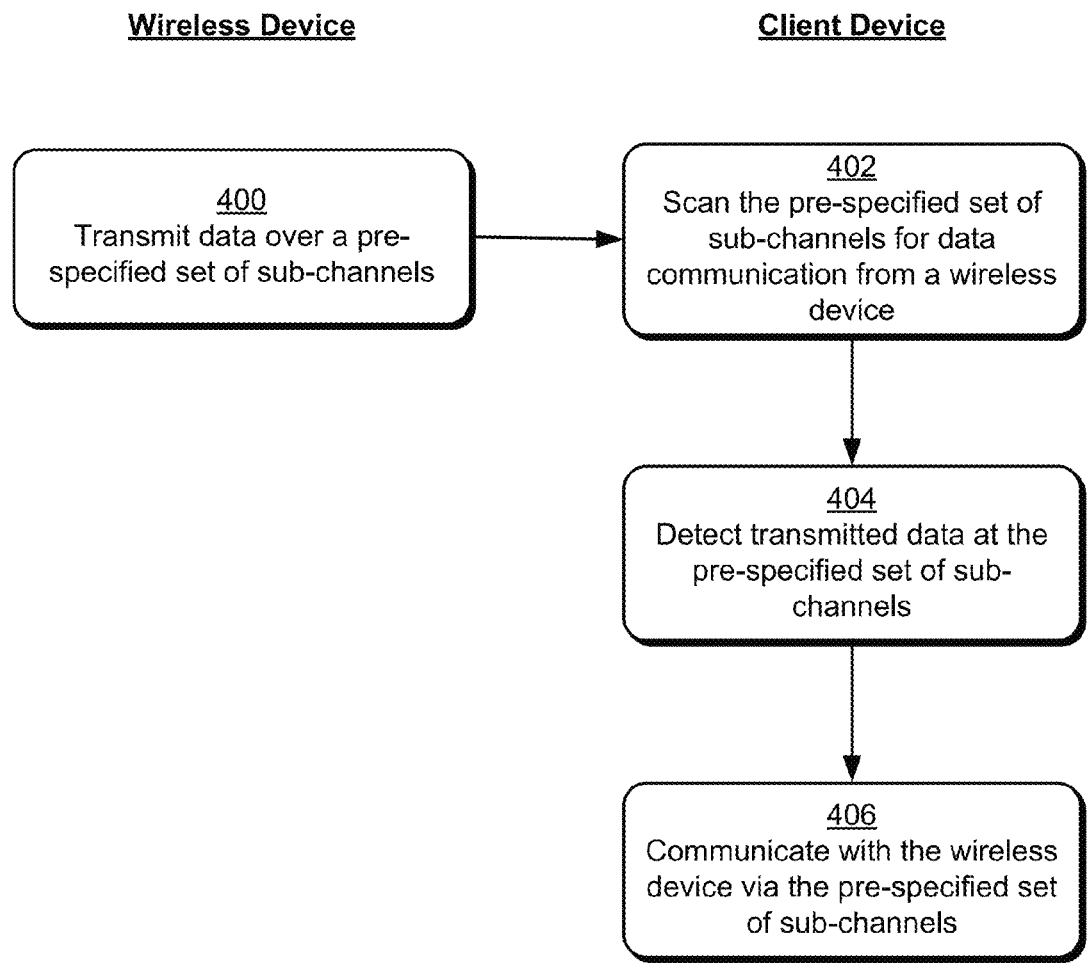
FIG. 4 is a flow diagram that describes steps in a method in accordance with one or more embodiments.

FIG. 4 is a flow diagram that describes steps in a method in accordance with one or more embodiments. In at least some implementations, the method can be implemented via the environment 100 and/or the system 200. In this particular example, the method includes steps that occur at a wireless device, and steps that occur at a client device.

Step 400 transmits data over a pre-specified set of sub-channels. For instance, a wireless device can be pre-configured to transmit and/or receive data via a pre-specified subset of sub-channels, such as a subset of available RF channels.

Step 402 scans the pre-specified set of sub-channels for data communication from a wireless device. For instance, a client device (e.g., the computing device 102 and/or client device 204) can monitor the pre-specified subset of sub-channels for data communication from a wireless device. Alternatively or additionally, a client device can transmit a request to establish a connection (e.g., a WLAN connection) via the pre-specified set of sub-channels. The request, for instance, can include a data packet, such as an association request packet, a SYN packet, and so on.

Step 404 detects transmitted data at the pre-specified set of sub-channels. For example, the transmitted data can include an association request from a wireless device, an acceptance (e.g., an acknowledgement) in response to a previously-transmitted association request from a client device, and/or a variety of other types of data. Step 406 communicates with the wireless device via the pre-specified set of sub-channels. For instance, a WLAN connection can be established between a client device and a wireless device via the pre-specified set of sub-channels.

While various embodiments may utilize pre-specified channels at both the transmitter and receiver for wireless data communication, at least some implementations may alternatively or additionally utilize channel scanning to detect channels at which a wireless device is transmitting data. For instance, consider the follow example implementations.

Figure 5:
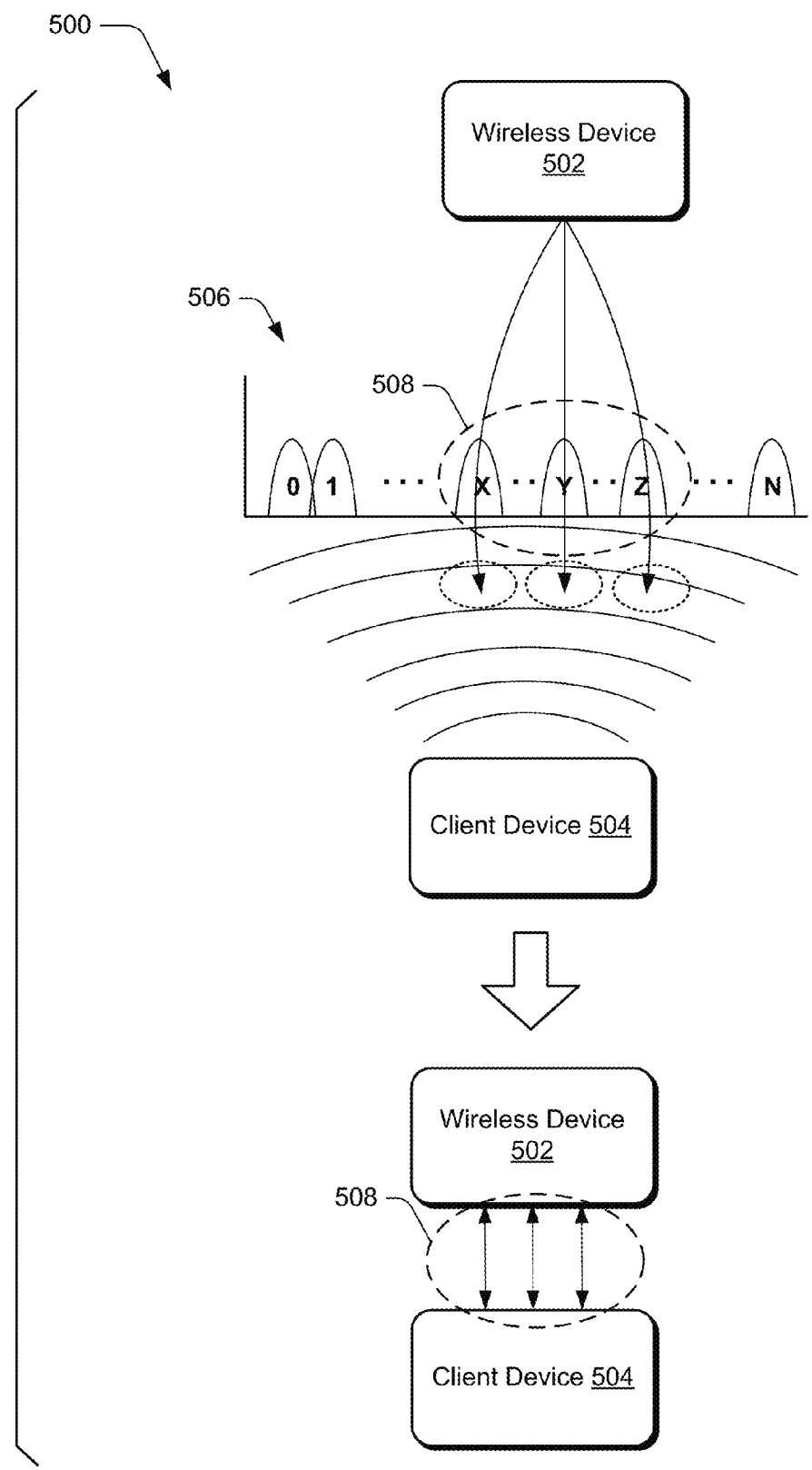
FIG. 5 is an illustration of an example system that is operable to employ techniques discussed herein in accordance with one or more embodiments.

FIG. 5 illustrates an example system 500, which can be employed to implement techniques for sub-channel detection for wireless data communication discussed herein. The system 500 includes a wireless device 502, which can be configured as an embodiment of the wireless device 110, discussed above. The system 500 further includes a client device 504, which can be configured as an embodiment of the computing device 102.

Further illustrated is a sub-channel set 506, which includes a set of sub-channels that are available for wireless data communication, e.g., with the client device 504. The sub-channel set 506, for instance, can correspond to sub-channels in a particular RF band, examples of which are discussed above. In at least some implementations, the sub-channel set 506 corresponds to sub-channels that the client device 504 is configured to utilize for wireless data communication, e.g., according to wireless software and/or hardware capabilities of the client device 504. In this example, the sub-channel set 506 includes N number of available sub-channels.

In the upper portion of the system 500, the wireless device 502 transmits data over a subset 508 of the sub-channel set 506. The subset 508 includes a discrete subset of the sub-channel set 506, and can be configured as contiguous (e.g., continuous) sub-channels, non-contiguous sub-channels, or combinations thereof. Further, although the subset 508 is illustrated as including 3 sub-channels, embodiments may employ subsets with any suitable number of sub-channels. Thus, in at least some embodiments, the wireless device 502 is configured to communicate via channels of the subset 508, and not via other channels of the sub-channel set 506. For instance, when transmitting data wirelessly, the wireless device 502 can apply energy to channels of the subset 508 for wireless data transmission, and can leave the remaining channels of the sub-channels null, e.g., not energized.

In at least some implementations, to aid in enabling the client device 504 to detect transmitted data, the wireless device 502 can apply various processing to the data prior to transmitting the data via the subset 508. For instance, the client device 504 can perform various types of transformations to the data prior to transmission. As detailed below, one example of such as transformation is an inverse Fourier transform.

Further illustrated is that the client device 504 scans the sub-channel set 506 to check for signal transmission over some or all of the sub-channels. For instance, the client device 504 can ascertain whether energy is being applied to specific sub-channels of the sub-channel set 506. If the client device 504 detects energy at one or more of the sub-channels, the client device 504 can further ascertain whether the energized channel(s) include readable data, such as data packets that can be interpreted by the client device 504.

In at least some embodiments, as the client device 504 scans the sub-channel set 506, the client device 504 applies various types of processing to signal received via the sub-channels being scanned. For instance, the client device 504 can apply a Fourier transform to signal received via each of the scanned sub-channels. As discussed below, applying the Fourier transform to signal from each of the scanned sub-channels can provide a signal strength for signal received (if any) via each of the scanned sub-channels. The signal strength can be indicated in any suitable unit, such as in mW, dB, dBm, and so on. As also discussed below, the determined signal strength can be compared to a threshold signal strength. Signals that exceed the threshold signal strength can be processed to ascertain information about the signals, such as the signal source, data within the signal, and so forth. Signals that fall below the threshold signal strength can be ignored, e.g., not processed.

When the client device 504 scans the sub-channel set 506, the client device 504 detects the signal transmission in the subset 508. For instance, the signal that is processed from the subset 508 (e.g., using a Fourier transform) can be determined to meet or exceed a threshold energy level, and thus can be further processed to determine information about the signal. The information about the signal can include an indication of the signal source, such as an identifier for the wireless device 502.

Continuing to the lower portion of the system 500, and in response to detecting and processing the signal transmission via the subset 508, a wireless connection is established between the client device 504 and the wireless device 502 via the sub-channels of the subset 508. Thus, hardware and/or software capabilities of the client device 504 can enable it to communicate wirelessly via more than just the sub-channels of the subset 508, e.g., all of the sub-channels of the sub-channel set 506. In at least some implementations, however, the client device 504 and the wireless device 502 can communicate via the subset 508 and not via others of the sub-channel set 506. This can enable the wireless device 502 to conserve battery charge, such as battery charge that may be utilized to transmit signal via more sub-channels than the subset 508.

Figure 6:
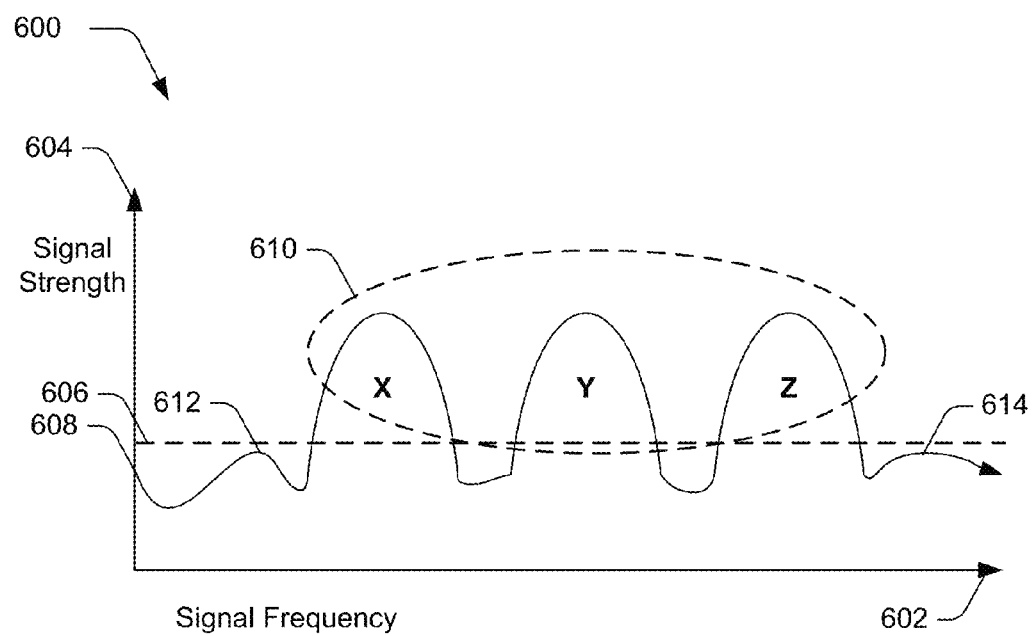
FIG. 6 is an illustration of an example signal graph that can be employed according to techniques discussed herein and in accordance with one or more embodiments.

FIG. 6 illustrates a signal graph 600 that plots results of signal analysis over a specific frequency range in accordance with various embodiments. With reference to the system 500 above, for instance, the signal graph 600 can provide a visual indication of the signal strength detected by the client device 504 when scanning the sub-channel set 506. In at least some implementations, the signal graph 600 can represent an application of a Fourier transform to signal that is received, an example of which is detailed below.

The signal graph 600 includes a frequency axis 602, which indicates frequency values over a particular frequency range. For instance, the frequency axis 602 can represent a range of 20 MHz within a particular frequency band, examples of which are discussed above. This is not intended to be limiting, however, and a wide variety of different frequency ranges and/or frequency bands can be represented in accordance with various embodiments.

Further included as part of the signal graph 600 is a signal strength axis 604, which indicates signal strength at particular frequencies indicated by the frequency axis 602. The signal strength axis 604 can utilize any suitable unit, such as mW, dB, dBm, and so forth. A threshold line 606 indicates a threshold signal strength for signal analyzed via the signal graph 600. As discussed above and below, signals that meet and/or exceed a threshold signal strength can be processed to determine information about the signal. Signals that fall below the threshold signal strength, however, can be ignored and/or processed in a different way than signal that meets or exceeds the threshold signal strength.

The signal graph 600 further includes a signal line 608, which plots detected signal strength at specific signal frequencies. With reference to the system 500, for instance, the signal line 608 can indicate signal strength detected by the client device 504 for scanned frequencies of the sub-channel set 506. As discussed above and below, various operations and/or algorithms can be applied to signal that is received before the signal is graphed. For instance, a Fourier transform can be applied to the signal, and the result of the Fourier transform can be graphed to produce the signal line 608.

The signal line 608 includes a peak set 610, which corresponds to a set of frequencies in which the detected signal strength exceeds the threshold signal line 606. With reference to the system 500, for instance, the peaks of the peak set 610 can correspond to the detected signals of the subset 508 transmitted from the wireless device 502. Thus, as discussed above and below, channels and/or sub-channels that correspond to the peak set 610 can be utilized for wireless data communication.

Further illustrated are a peak 612 and a peak 614, that do not meet or exceed the threshold signal line 606. Accordingly, signal that corresponds to sub-channels associated with these peaks can be ignored and/or processed in a different manner than sub-channels associated with the peak set 610.

Figure 7:
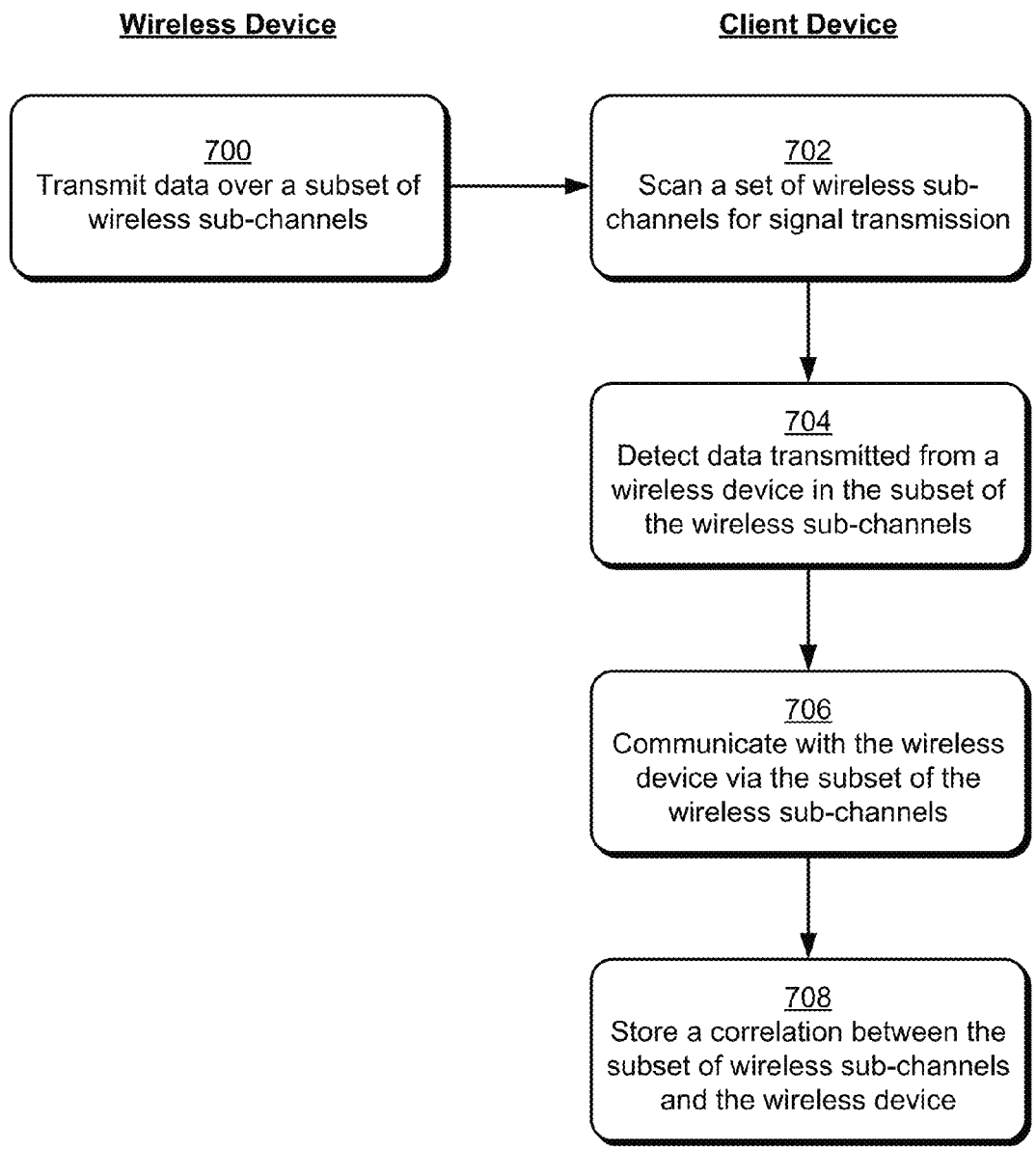
FIG. 7 is a flow diagram that describes steps in a method in accordance with one or more embodiments.

FIG. 7 is a flow diagram that describes steps in a method in accordance with one or more embodiments. In at least some implementations, the method can be implemented via the environment 100 and/or the system 500. In this particular example, the method includes steps that occur at a wireless device, and steps that occur at a client device.

Step 700 transmits data over a subset of wireless sub-channels. As referenced above, a wireless device can be pre-configured to transmit and/or receive data via a subset of sub-channels. Alternatively or additionally, a wireless device can select a subset of sub-channels to use for data communication "on-the-fly," such as based on a number of factors. One such factor can be battery level, e.g., the amount of charge left in a battery. For instance, if an amount of charge left in a battery becomes critically low, a wireless device can reduce the number of sub-channels on which to transmit data to conserve battery life.

Another such factor can be an amount of data to be transmitted and/or received. For instance, if a data transmission rate increases (e.g., as in megabits per second or other appropriate unit), a number of channels used to transmit and/or receive data can increase. Consider a scenario, for example, where a user is providing simple input to a wireless touchpad, such as input via single-finger gestures. In such a scenario, X number of sub-channels may be used to transmit data from the wireless touchpad to a receiving client device. Further to this scenario, the user then begins providing more complex, multi-finger gestures that generate an increased amount of data for transmission. In response to the increased amount of data (e.g., increased data rate), the number of sub-channels used to transmit data from the wireless touchpad can be increased, such as to X+1, X+2, and so on, to accommodate the increased amount of data to be transferred from the wireless touchpad to the client device. A variety of other factors may additionally or alternatively be considered in determining a number of sub-channels to utilize for transmitting data to and/or receiving data from a wireless device.

As referenced above, prior to transmitting data, the data can be transformed in a variety of different ways to aid in detection and/or processing by a receiving device. For instance, an inverse Fourier transform can be applied to the data to be transmitted as follows.

Denote data to be transmitted as a sequence of complex numbers $C_0, C_1, \ldots, C_{N-1}$ (e.g., complex numbers as a representation of phase modulation) of block length N. The Inverse Fast Fourier Transform (IFFT) shown in the figure performs the following operation:

$$c_k = \sum_{i=o}^{N-1} C_i e^{2\pi j \frac{ik}{N}},$$

$$k = 0, \ldots, N-1,$$

with j being the complex exponent. Notice then an output including a sequence of length N. An FFT performed at a receiving device performs the inverse operation. Transmitting via the sub-channels then translates to transmitting a subset of the coefficients $C_k$ that is nulling out sub-channels in transmission.

Returning to the method, step 702 scans a set of wireless sub-channels for signal transmission. For instance, a client device can scan a set of wireless sub-channels for energy and/or data being transmitted via the sub-channels.

Step 704 detects data transmitted from a wireless device in the subset of wireless sub-channels. In at least some implementations, received wireless signal can be processed in various ways to detect transmitted data. The signal graph 600 discussed above with reference to FIG. 6 provides a visual example of signal detection at particular sub-channels. Further, an example implementation of step 704 is detailed below in FIG. 8.

Step 706 communicates with the wireless device via the subset of the wireless sub-channels. For instance, data can be transmitted from the wireless device to a receiving device via the subset of sub-channels, and/or data can be transmitted from the receiving device to the wireless device via the subset of sub-channels. In at least some implementations, a direct WLAN connection can be established between the wireless device and a client device via the subset of sub-channels.

Step 708 stores a correlation between the subset of wireless sub-channels and the wireless device. For instance, a client device can maintain a table that correlates particular wireless devices with particular subsets of wireless sub-channels. One example of such a table is illustrated in FIG. 3. Thus, when a client device detects a wireless device at a particular set of wireless sub-channels, such as according to the techniques discussed above, the client device can store an entry in the table that associates the wireless device with the subset of wireless sub-channels. Accordingly, as part of subsequent wireless data communication with the wireless device, the client device can simply scan the subset of wireless sub-channels known to be associated with the wireless device, instead of scanning a larger set of sub-channels in an attempt to detect data communication from the wireless device.

Thus, in at least some implementations, a client device may not know beforehand which subset of sub-channels that a particular wireless device is using for wireless data communication. However, the client device may utilize techniques discussed herein determine the subset of sub-channels and to initiate data communication with the wireless device via the subset of sub-channels.

Figure 8:
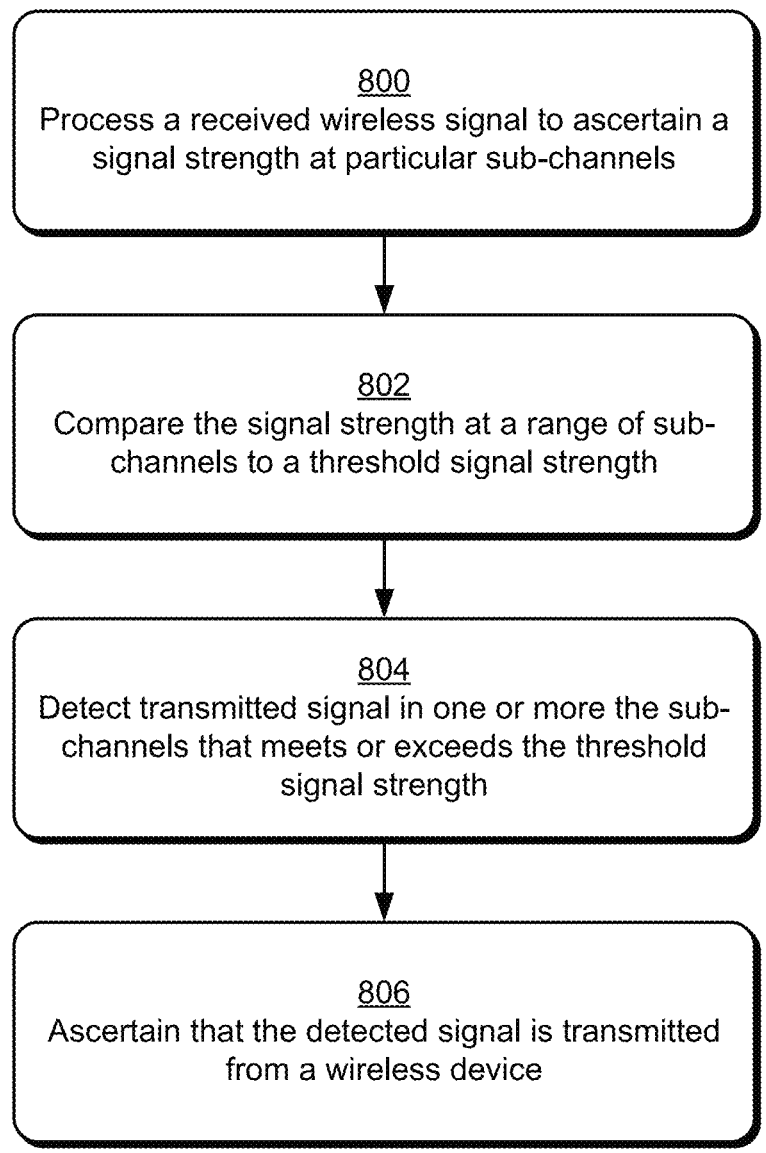
FIG. 8 is a flow diagram that describes steps in a method in accordance with one or more embodiments.

FIG. 8 is a flow diagram that describes steps in a method in accordance with one or more embodiments. In at least some implementations, the method describes an example implementation of step 704 discussed above with reference to FIG. 7.

Step 800 processes a received wireless signal to ascertain a signal strength at particular sub-channels. For instance, a Fourier transform can be applied to signal received across a particular frequency range. The following is an example application of a Fourier transform to received signal:

The receive operation is an FFT denoted by:

$$C_k = \sum_{i=0}^{N-1} c_i e^{-2\pi j \frac{ik}{N}},$$

which is the inverse operation of the equation earlier for IFFT. The coefficients ck are then compared to a threshold. If the coefficient is below a threshold, it can be declared an empty sub-channel. If it meets or exceeds the threshold, it can be considered as carrying data.

Step 802 compares the signal strength at a range of sub-channels to a threshold signal strength. For instance, the threshold signal strength can be pre-defined, such as in mW, dBm, and so forth. Alternatively or additionally, the threshold signal strength can be variable based on various environmental and/or device-related conditions.

Step 804 detects transmitted signal in one or more the sub-channels that meets or exceeds the threshold signal strength. One example illustration of detecting such signal is illustrated in FIG. 6 and discussed above.

Step 806 ascertains that the detected signal is transmitted from a wireless device. For instance, the detected signal can include data that identifies that wireless device, such as data packets that include a device ID for the wireless device.

Reducing Redundancy in Correction Coding

According to one or more embodiments, various types of correction coding can be applied to data that is to be wirelessly transmitted as discussed above. Examples of such correction coding include forward error correction techniques such as repetition coding, block coding, convolutional coding, concatenated coding, and so forth. Correction coding can be applied to data that is transmitted wirelessly to enable a receiving device to detect and/or correct errors that may be introduced into the data during transmission.

Many types of correction coding are implemented by introducing redundancy into data that is to be transmitted. For instance, a simple error coding technique duplicates a particular bit of data once or multiple times, and transmits the original bit and its duplicates. The original bit and its duplicates can be processed by a receiving device in various ways to detect and/or correct errors in received data. For ease of discussion herein, data that is to be transmitted is referred to as "original data," and data that is generated based on original data for correction coding is referred to as "correction data." Thus, correction data can include redundant data, such as multiple copies and/or versions of original data.

According to techniques discussed herein, redundancy in correction data can be reduced for various reasons, such as to conserve power (e.g., battery charge life) and/or to increase a data transmission rate for transmission of original data. For instance, when redundancy in correction data is reduced, this can reduce the total amount of data that is to be transmitted. The total amount of data to be transmitted includes original data and correction data. Thus, reducing the amount of correction data can include eliminating some redundancy in the correction data that is introduced via correction coding prior to transmitting the data, such as by eliminating one or more duplicate bits.

Reducing the total amount of data that is to be transmitted by reducing redundancy in correction data can save battery power that would be used to transmit the correction data that is reduced and/or eliminated. Further, reducing the total amount of data that is to be transmitted can free up transmission bandwidth for transmission of additional original data. For instance, consider the following example implementation.

Figure 9:
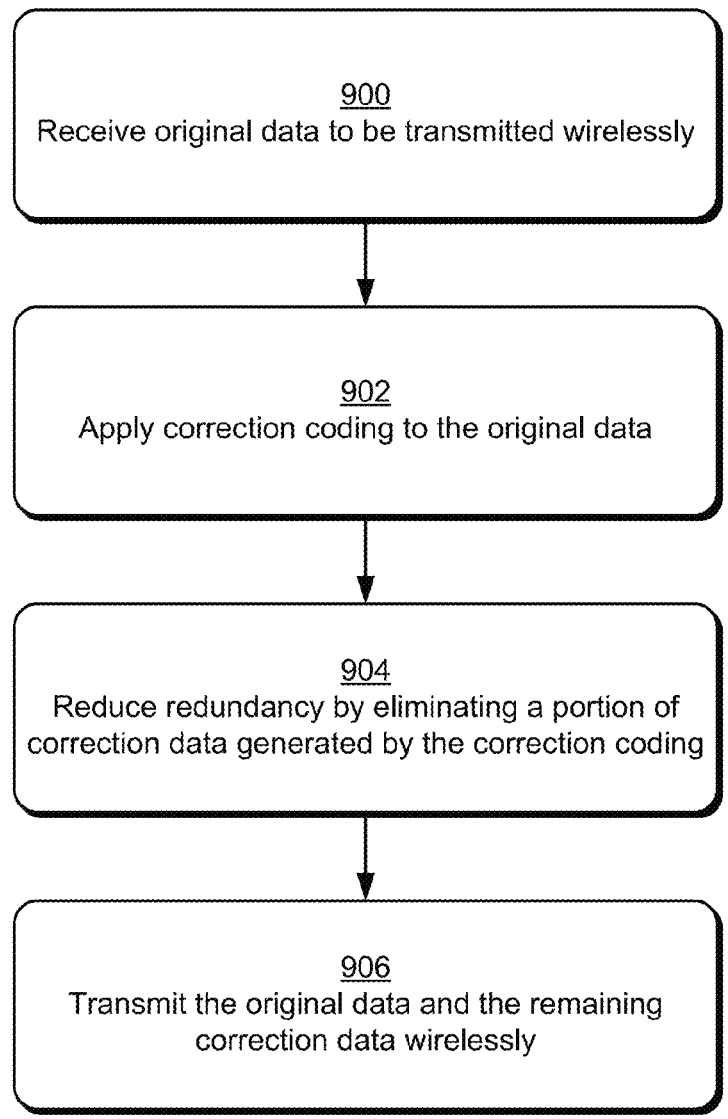
FIG. 9 is a flow diagram that describes steps in a method in accordance with one or more embodiments.

FIG. 9 is a flow diagram that describes steps in a method in accordance with one or more embodiments. In at least some implementations, the method can be implemented by an error encoder, such as an error encoding module included as part of the wireless device 110.

Step 900 receives original data to be transmitted wirelessly. The data can include data to be transmitted to and/or from a wireless device, such as the wireless device 110. For instance, original data can be generated based on user input to a wireless input device.

Step 902 applies correction coding to the original data. Examples of correction coding are listed above. In at least some implementations, applying correction coding to data introduces redundancy into data to be transmitted. For instance, a portion of data can be duplicated once or multiple times to generate correction data (e.g., copies of original data) to be transmitted with the original data for correction purposes at a receiving device.

Step 904 reduces redundancy by eliminating a portion of correction data generated by the correction coding. For instance, at least some of the duplicate data generating by the correction coding can be eliminated (e.g., deleted) prior to transmission.

In at least some implementations, an amount of correction data to be eliminated can depend on a number of factors. Examples of such factors include a signal quality between a transmitting device and a receiving device, an amount of original data to be transmitted, a level of battery charge remaining at a wireless device, and so on.

For example, with reference to signal quality, a threshold signal-to-noise (S/N) ratio can be specified for wireless data transmission between a wireless device and a receiving device. Signal that meets or exceeds the threshold S/N ration can be considered high quality signal, and signal that falls below the threshold S/N ratio can be considered low quality signal. Since it is less likely that errors will be introduced into data during transmission of a high quality signal, more correction data can be eliminated from a high quality signal. A low quality signal, however, may indicate an increased likelihood that errors will be introduced into data during transmission. Thus, less correction data can be eliminated from low quality signal such that more correction data is available on the receiving side to detect and/or correct errors in received original data.

With reference to an amount of original data to be transmitted, an amount of correction data in a signal can be reduced based on an amount of original data to be transmitted. For instance, some activities may generate more original data to be transmitted than others. For example, an amount of data transmitted from a wireless keyboard while typing is occurring may be relatively low when compared to an amount of data transmitted from a wireless game controller during gameplay. Thus, as an amount of original data that is to be transmitted increases for high data transmission activities, more correction data can be eliminated to free up bandwidth for transmission of original data. Additionally or alternatively, as an amount of original data to be transmitted decreases, less correction data can be eliminated.

An amount of battery charge remaining at a wireless device can also be considered when determining how much correction data to eliminate. For instance, a threshold battery charge level can be defined, such as with reference to a percentage of total battery charge remaining. When actual battery charge falls below the threshold battery charge level, an amount of correction data that is eliminated can be increased. This can conserve battery power that would be utilized to transmit the correction data that is eliminated.

Step 906 transmits the original data and the remaining correction data wirelessly. For instance, the wireless device 110 can transmit the data for receipt by the computing device 102. In at least some implementations, the transmitted data can include an indication of an amount and/or type of correction data that is transmitted with the original data. The indication can be used by a receiving device to decode the data and to apply the correction data for purposes of error correction. Thus, a receiving device can decode the original data using the remaining correction data.

Having discussed some example implementation scenarios, consider now a discussion of an example system and device in accordance with one or more embodiments.

Example System and Device

Figure 10:
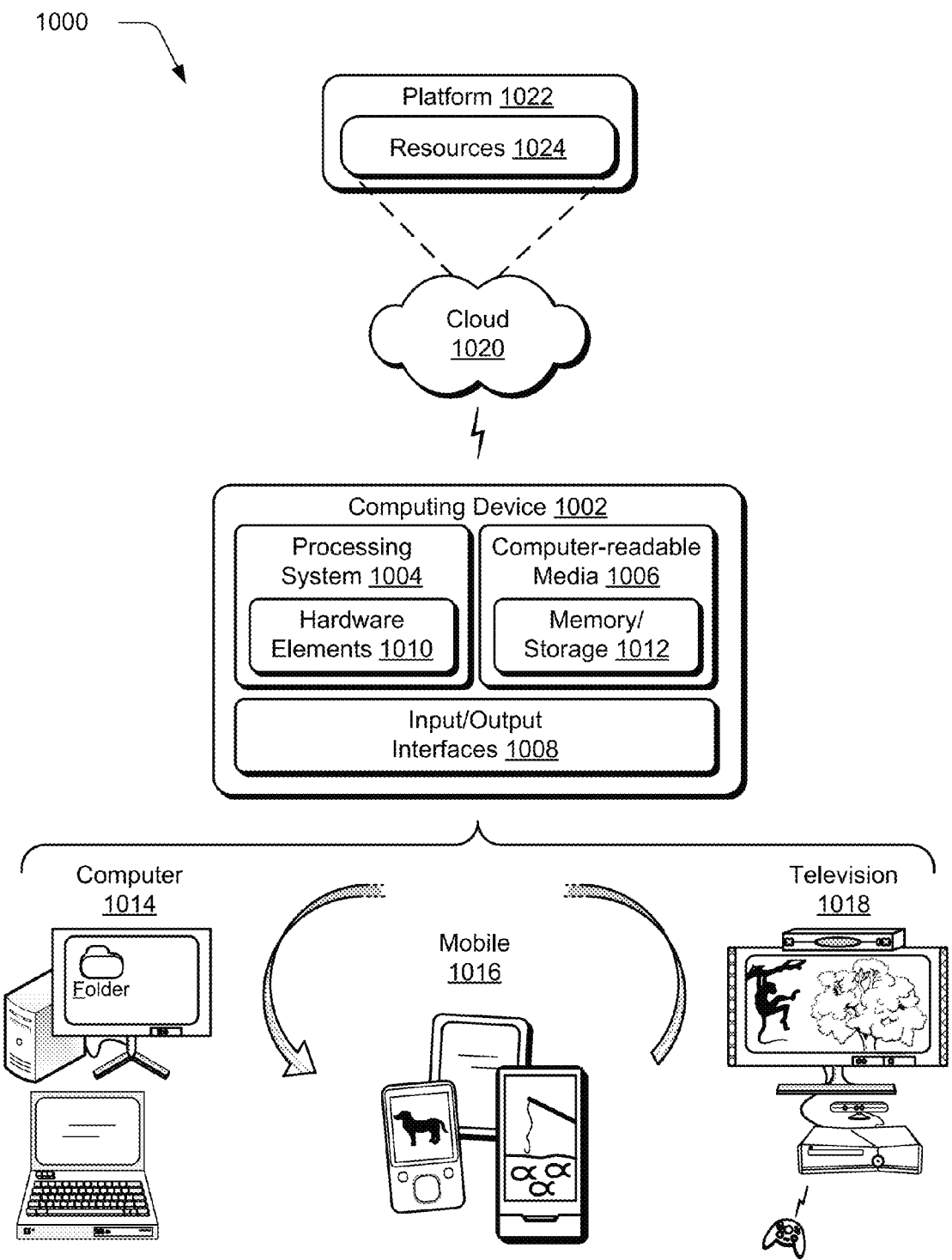
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the computing device 102 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1100 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1100. The computing device 1002 may be configured to implement particular instructions and/or functions corresponding to the software and/or hardware modules. Accordingly, implementation of modules as an module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the client wireless module 104 and/or the device wireless module 112 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi™ network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for sub-channel detection for wireless data communication are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
    identifying, by a client device, a device table that includes different device types of at least one of input device types or output device types, and different pre-specified sets of wireless sub-channels that are each specific to a particular device type of the different device types;
    identifying a pre-specified set of wireless sub-channels associated with a particular wireless device from the device table;
    scanning, by the client device, the pre-specified set of wireless sub-channels for signal transmission from the particular wireless device;
    detecting, at the client device and independent of an intermediate entity, data transmitted from the wireless device in the pre-specified set of wireless sub-channels by comparing a function of the signal strength in the pre-specified set of wireless sub-channels to a threshold, and determining at the client device that signal in the discrete subset of multiple of the wireless sub-channels meets or exceeds the threshold signal strength; and
    initiating, at the client device and independent of the intermediate entity, data communication with the wireless device via the pre-specified set of wireless sub-channels, the wireless device comprising at least one of an input device configured to provide input to the client device, or an output device configured to output information from the client device.

2. A computer-implemented method as described in claim 1, wherein said initiating comprises establishing a direct wireless local area network (WLAN) connection between the client device and the wireless device via the pre-specified set of wireless sub-channels.

3. A computer-implemented method as described in claim 1, wherein the data transmitted from the wireless device comprises a request from the wireless device to form a direct wireless local area network (WLAN) connection with the wireless device via the pre-specified set of wireless sub-channels, and wherein said initiating comprises establishing a direct WLAN connection between the client device and the wireless device via the pre-specified set of wireless sub-channels.

4. A computer-implemented method as described in claim 1, wherein said detecting comprises ignoring one or more sub-channels of the pre-specified set of wireless sub-channels responsive to determining that the signal for the one or more sub-channels of the pre-specified set of wireless sub-channels falls below the threshold signal strength.

5. A computer-implemented method as described in claim 1, further comprising storing, in the device table, an indication of an association between the pre-specified set of wireless sub-channels and the wireless device to be used for subsequent data communication with the wireless device.

6. A computer-implemented method as described in claim 1, wherein the sub-channels comprise divisions of a radio frequency (RF) channel.

7. A computer-implemented method as described in claim 1, wherein said detecting comprises ignoring one or more sub-channels of the pre-specified set of wireless sub-channels responsive to determining that the signal for the pre-specified set of wireless sub-channels falls below the threshold signal strength, such that wireless communication between the client device and the wireless device is not established utilizing all of the pre-specified set of wireless sub-channels.

8. One or more computer-readable storage media comprising instructions stored thereon that, responsive to execution by a computing device, cause the computing device to perform operations comprising:
    identifying, by a client device, a device table that includes different device types of at least one of input device types or output device types, and different pre-specified sets of wireless sub-channels that are each specific to a particular device type of the different device types;
    identifying a pre-specified set of wireless sub-channels associated with a particular wireless device from the device table;
    processing, by the computing device and independent of an intermediate device, a received wireless signal to ascertain a signal strength for individual sub-channels of the pre-specified set of sub-channels included in the wireless signal;
    comparing the signal strength of the individual sub-channels within the pre-specified set of sub-channels to a threshold signal strength;
    detecting signal in the pre-specified set of sub-channels that meets or exceeds the threshold signal strength; and
    initiating, by the computing device and independent of the intermediate device, data communication between the computing device and a wireless device via the pre-specified set of sub-channels responsive to ascertaining that the signal in the pre-specified set of sub-channels is transmitted from the wireless device, the wireless device comprising one of an input device configured to provide input to the computing device via the pre-specified set of sub-channels, or an output device configured to output information from the computing device via the pre-specified set of sub-channels.

9. One or more computer-readable storage media as recited in claim 8, wherein the operations further comprise processing the wireless signal by applying a Fourier transform to the wireless signal to ascertain the signal strength for the individual sub-channels within the pre-specified set of sub-channels.

10. One or more computer-readable storage media as recited in claim 8, wherein the operations further comprise causing the computing device to initiate data communication with the wireless device by established a direct wireless local area network (WLAN) connection between the computing device and the wireless device.

11. One or more computer-readable storage media as recited in claim 8, wherein the operations further comprise at least one of receiving input from or providing input to the wireless device via the data communication with the wireless device.

12. One or more computer-readable storage media as recited in claim 8, wherein the operations further comprise storing, in the device table, an indication of an association between the pre-specified set of sub-channels and the wireless device, wherein the indication of the association is configured to be used to initiate subsequent data communication between the computing device and the wireless device.

13. One or more computer-readable storage media as recited in claim 8, wherein said processing is performed response to scanning the pre-specified set of wireless sub-channels for signal transmission from the particular wireless device.

14. One or more computer-readable storage media as recited in claim 8, wherein said detecting includes ignoring one or more sub-channels of the pre-specified set of wireless sub-channels responsive to determining that the signal for the one or more sub-channels of the pre-specified set of wireless sub-channels falls below the threshold signal strength.

15. A wireless device comprising:
   at least one processor; and
   one or more computer-readable storage media including instructions stored thereon that, responsive to execution by the at least one processor, cause the wireless device to perform operations comprising:
      identifying a device table that includes different device types of at least one of input device types or output device types, and different pre-specified sets of wireless sub-channels that are each specific to a particular device type of the different device types;
      identifying a pre-specified set of wireless sub-channels associated with a particular different device from the device table;
      processing, by the wireless device and independent of an intermediate device, a received wireless signal to ascertain a signal strength for individual sub-channels of the pre-specified set of sub-channels included in the wireless signal;
      comparing the signal strength of the individual sub-channels within the pre-specified set of sub-channels to a threshold signal strength;
      detecting signal in the pre-specified set of sub-channels that meets or exceeds the threshold signal strength; and
      initiating, by the wireless device and independent of the intermediate device, data communication between the wireless device and a different device via the pre-specified set of sub-channels responsive to ascertaining that the signal in the pre-specified set of sub-channels is transmitted from the different device, the different device comprising one of an input device configured to provide input to the wireless device via the pre-specified set of sub-channels, or an output device configured to output information from the wireless device via the pre-specified set of sub-channels.

16. A wireless device as described in claim 15, wherein the operations further comprise causing the wireless device to initiate data communication with the different device by established a direct wireless local area network (WLAN) connection between the wireless device and the different device.

17. A wireless device as described in claim 15, wherein the operations further comprise at least one of receiving input from or providing input to the different device via the data communication with the different device.

18. A wireless device as described in claim 15, wherein the operations further comprise storing, in the device table, an indication of an association between the pre-specified set of sub-channels and the different device, wherein the indication of the association is configured to be used to initiate subsequent data communication between the wireless device and the different device.

19. A wireless device as described in claim 15, wherein said processing is performed response to scanning the pre-specified set of wireless sub-channels for signal transmission from the particular different device.

20. A wireless device as described in claim 15, wherein said detecting includes ignoring one or more sub-channels of the pre-specified set of wireless sub-channels responsive to determining that the signal for the one or more sub-channels of the pre-specified set of wireless sub-channels falls below the threshold signal strength.

* * * * *